United States Patent

Ng

(10) Patent No.: US 8,260,954 B2
(45) Date of Patent: Sep. 4, 2012

(54) PROCESS FOR COMMUNICATION BETWEEN A DEVICE RUNNING A MOBILE DEVICE PLATFORM AND A SERVER OVER THE AIR, AS WELL AS RELATED SYSTEM

(75) Inventor: Chee Wei Ng, Kuala Lumur (MY)

(73) Assignee: Cassis International Pte. Ltd., Singapore (SG)

( * ) Notice: Subject to any disclaimer, the term of this patent is extended or adjusted under 35 U.S.C. 154(b) by 0 days.

(21) Appl. No.: 13/065,918

(22) Filed: Apr. 1, 2011

(65) Prior Publication Data

US 2011/0185081 A1 Jul. 28, 2011

(51) Int. Cl.
*G06F 15/16* (2006.01)
(52) U.S. Cl. .......... 709/236; 709/237; 709/217
(58) Field of Classification Search .......... 709/236, 709/237, 217
See application file for complete search history.

(56) References Cited

U.S. PATENT DOCUMENTS

| 7,039,671 B2 * | 5/2006 | Cullen .......... 709/201 |
| 2003/0088691 A1 * | 5/2003 | Audebert et al. .......... 709/237 |
| 2006/0129689 A1 * | 6/2006 | Ho et al. .......... 709/230 |

* cited by examiner

*Primary Examiner* — Krista Zele
*Assistant Examiner* — Andrew Georgandellis
(74) *Attorney, Agent, or Firm* — James R. Klaiber; Pryor Cashman LLP

(57) ABSTRACT

Process of communication via HTTP or HTTPS between a device running Java ME® and a server over the air, said server receiving and transmitting SOAP (Simple Object Access Protocol) messages from/to an operator on a host over a network and being capable of exchanging SOAP messages under Application Protocol Data Unit (APDU) data form/with the device, characterized in that the SOAP messages are translated from/to binary messages according to a protocol in the server, said binary messages being exchanged with the device, the binary messages being binary request messages or binary response messages.

21 Claims, 3 Drawing Sheets

PROCESS FOR COMMUNICATION BETWEEN A DEVICE RUNNING A MOBILE DEVICE PLATFORM AND A SERVER OVER THE AIR, AS WELL AS RELATED SYSTEM

CROSS-REFERENCE TO RELATED APPLICATIONS

This application claims priority to PCT Application PCT/IB2007/003716, filed Nov. 30, 2007, and EPO Application 06301199.3, filed Nov. 30, 2006, the disclosures of which are incorporated herein by reference.

FIELD OF THE INVENTION

The present invention relates to a process for communication between a device running Java ME® and a server over the air, as well as related system.

BACKGROUND OF THE INVENTION

The current invention defines a new communication process using a Java ME (J2ME) application as a proxy between a smart card on a mobile device (whether an SIM, embedded secure element, detachable secure SD, secure MMC, or any other smart card form factor) and web based application server, which is supporting SOAP messaging, to provide greater efficiency and auto recovery functionality. This process contains a protocol allowing adaptive fragmentation of data packet, optimized message format and auto recovery functionalities for a Java ME® (JME) application to communicate with an application server over the air via HTTP or HTTPS. The application server, which can understand the protocol translates to another message protocol and route it to the end point host. The end point message can be proprietary XML or open standard Simple Object Access Protocol (SOAP) message. The protocol provides auto recovery by re-sending the last message over again whenever there is no response message received within a certain period of time. It has applications notably in the communication industries. A system is also described.

More and more portable devices with smart cards are in use. These devices are intended to communicate with operators on a host over a network. The communication between the device and the network is done through a server generally called a channel gateway. Some of these devices run Java ME® application and this is usually done with limited resource in terms of memory and processing power. Moreover, the communication technology used in the device is slow and possibly unreliable with realistic speeds up to 56 Kbps.

As the application server moves towards web services oriented architecture, the default messaging protocol to communicate with the server is a SOAP message over HTTP or HTTPS. However, the parsing and serializing of SOAP message requires much more processing and memory than a binary message. Moreover, the size of the message is much larger than a binary message.

As stated above, a SOA smart card management system encapsulates APDU messages in SOAP and transmits them over a wired or wireless network. For a Java ME application running on a mobile device with GPRS® or 3G® wireless connection to communicate with the system, the device requires bigger memory for temporary storage of SOAP and a faster processor to parse and extract the APDU data out of the SOAP message. The data transmitted over the air could be restricted in size per connection by mobile operator.

So, there is a cap on the data transfer size controlled at the gateway of the mobile operator. The packet data exchanged between the device and the server is required to divide into smaller packets which is lower than the cap size so that the packet can be transmitted smoothly over the operator network. The packet shall be determined by cell location in which the device registered on.

Hence, to overcome this, on-demand adaptive adjustment of the data size per connection is defined.

The transport of APDU data over time is a non-guaranteed reliable connection. Beside that, the underlying JVM runs on the device may not properly garbage collect the resources within certain period of time, hence it may leads to the subsequent open connection operation being blocked.

The current invention is intended to overcome such problems and to provide benefits which will be apparent from the description. Before this invention, the communication process between a smart card on a mobile device (such as an SIM) and an application server was via SIM application Toolkit commands and SMS (short messaging). But with this invention, which utilizes a gateway and a proxy of Java ME (J2ME) application on the mobile device, the delivery of more APDU commands to different types of smart card form factors on the mobile device is made more efficient and stable, thus overcoming wireless network limitations.

SUMMARY OF THE INVENTION

The invention is about a process of communication via HTTP or HTTPS between a device running Java ME® and a server over the air, said server receiving and transmitting SOAP (Simple Object Access Protocol) messages from/to an operator on a host over a network and being capable of exchanging SOAP messages under Application Protocol Data Unit (APDU) data form with the device.

According to the invention, the SOAP messages are translated from/to binary messages according to a protocol in the server, said binary messages being exchanged with the device, and in case the message cannot hold in one binary message the exchange is made in batch transmission of a plurality of binary messages, and for a communication according to the protocol to execute, the following steps are implemented:
  the device first sends to the server a binary message including an APDU exchange request and service initialization information to identify an operator,
  in response, the server sends back to the device a binary message of a batch of APDU commands with fragmented details in an Information Segment, then:
  if said batch of APDU commands is not fragmented, the device sends a binary message including an execution result of said batch of APDU commands to complete the transaction for said batch,
  if said batch of APDU commands is fragmented, the device sends a request for more fragment with the next fragment sequence and waits for a binary message from the server for the next fragment and when all fragments are received the device executes said batch, and when the transaction is complete for said batch the device waits for a binary message from the server for a possible next batch.

The following means, possibly used in all possible technical combinations, are also considered in the invention:
  the binary messages are a binary request message and a binary response message, the binary request message has a header segment part of seven bytes, a body segment part of N bytes and an information segment part of five bytes, the binary response message has a header segment part of seven bytes, a body segment part of N bytes and an information segment part of three bytes, binary messages are according to the tables described in this document, the body segment part of the binary messages is fragmentable, more fragment may be requested with a binary request message for more fragment having a header segment part of two bytes and a body segment part of one byte, the response of the request for more fragment being a binary response message for more fragment having a header segment part of two bytes and a body segment part of one byte, recovery and auto-retry means are implemented, messages being saved before being sent at predefined saving points of the process, the saving points are, in the server, each time the server sends to the device a binary message including APDU commands, and, in the device, each time the device sends to the server a binary message including an execution result of APDU commands, a counter of time is started in the device each time the device sends an execution result of APDU commands message and if the server is not reacting after a predetermined count of time, the device executes a retry by resending the message from the related saving point, a predetermined number of retries is authorized for each saving point before aborting the process, in case the process is aborted the response code is an error code and in other case the response code is a success code.

A system, which has means for the execution of the process in one or more of its described actions, is also part of the invention. Moreover, the system is made of individual physical entities (for example a device running JavaME®, a host . . . ) and each one of those entities which has means to operate according to the process is also part of the invention.

Thanks to the invention, full utilization of binary message as a protocol for effective communication between the limited device such as mobile phone and SOA smart card management system is possible. The gateway provides a optimized channel and translator for APDU message exchange. The invention leverages the adaptive fragmentation of data to cater for multiple mobile operators without re-developing the application to handle the limitation of data transfer controlled by the operator.

In addition, with the introduction of save points on both the application and the gateway, the application resides on the limited device and can effectively re-send the last request message to the gateway and the gateway will be able to recover the response correctly

BRIEF DESCRIPTION OF THE DRAWINGS

The invention will now be described in detail, without being restricted thereto, and in relation to.

DETAILED DESCRIPTION

Figure 1:
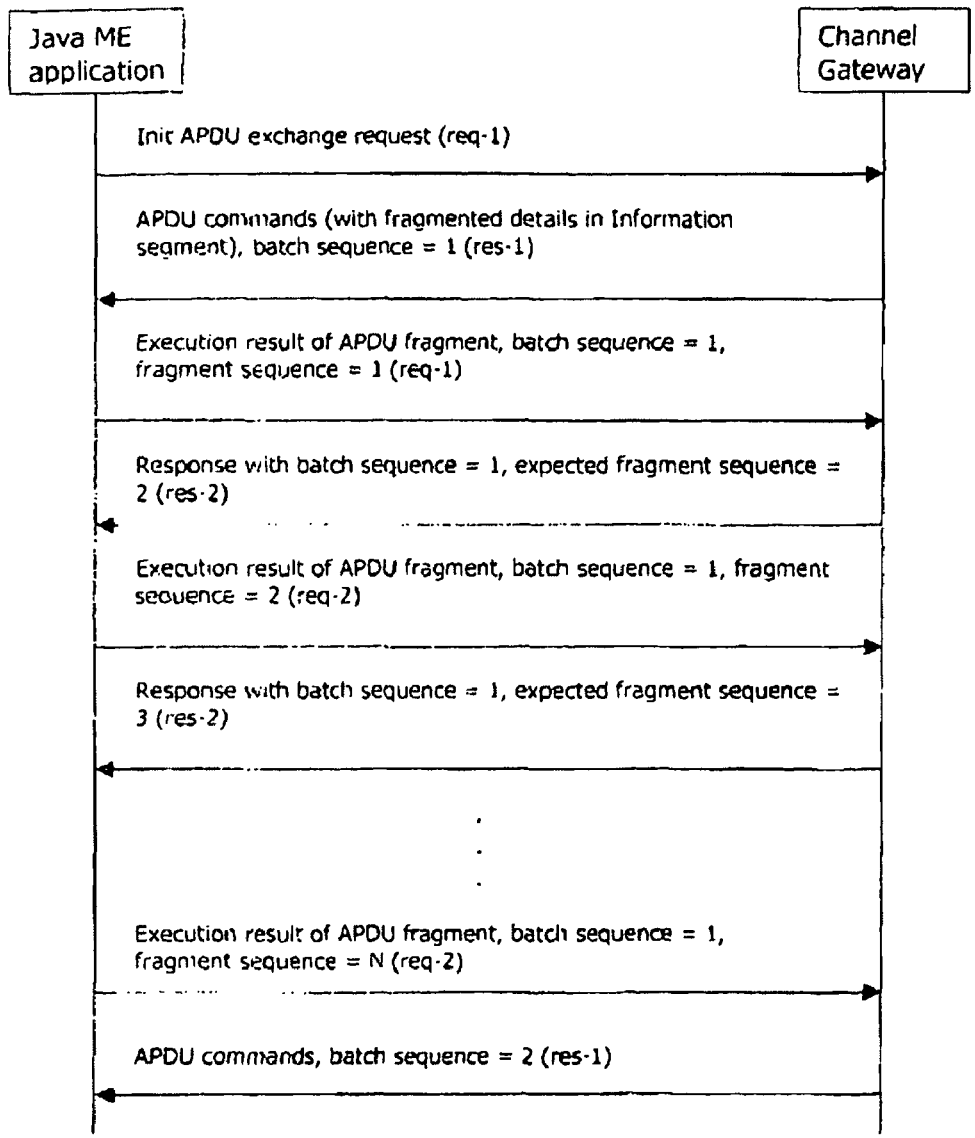
FIG. 1, which illustrates the process of communications between the Java ME® application and the gateway in case of the fragmentation of a batch of execution result of APDU from Java ME application to the gateway.

The process of the invention is now described in the form of a new communication protocol with adaptive data packet size, optimized message format and auto recovery functionalities for a Java ME® application to communicate with an application server over the air via HTTP or HTTPS.

The request is usually initiated from the Java ME application and when the smart card management system receives the request, it will prepare a sequence of APDU commands completing a pre-registered process transaction for the system (host) intended to communicate with the smart card, which can be any form factor, including SIM, embedded secure element, detachable secure SD, secure MMC, or any new type of smart card form factor. The system responds by sending at least one APDU commands to the remote Java ME application. Each collection of APDU commands exchanged between the application and the system is known as a Batch. In other words, a batch is an envelope that contains multiple complete APDU commands.

It involves multiple batches of APDU commands to be exchanged between the system (host) and the smart card device for each transaction to be completed. Each batch consists of at least one APDU command sent from the system. A corresponding batch is generated from the Java ME application after the APDU commands has been executed in the card. This is the execution result of APDU batch generated by the application.

In order to provide optimized computational processing and memory usage of the device running with Java ME® application, a binary message protocol is defined to handle the communication. There shall be an application running on the server side to perform the translation of the message from binary to SOAP and vice versa. This server is known as a Channel Gateway as it handles APDU channel delivery over the air. The binary message contains three segments, the following describes these segments:

Header segment: it contains the self-descriptive data.
Body segment: it contains the APDU commands or fragment of the commands if the fragmentation is required.
Information segment: it contains the useful and necessary information required by the receiver.

Hence, each batch of APDU commands encapsulated in the SOAP message is translated into a binary message within the gateway before being sent to the application running on the device. Similarly, the execution result of APDU which is in binary is translated into SOAP before being sent to the system (host) for further processing.

As mentioned, the data size transmitted over the air is being restrained by the mobile network operator, an adaptive approach for splitting of data into smaller fragments on each batch of APDU commands is required. Hence, each fragment contains partial of batch of APDU commands. The Java ME® application in the device can proceed to execute a batch once it receives all fragments and concatenate back into a single batch.

The binary request message initiated from Java ME® application, that is transmitted from the device side to the server/channel gateway side, shall have the format as shown in the following tables:

| Header Segment | | | | | | | Body Segment | | | | | Information Segment | | | | |
|---|---|---|---|---|---|---|---|---|---|---|---|---|---|---|---|---|
| h(1) | h(2) | h(3) | h(4) | h(5) | h(6) | h(7) | b(1) | b(2) | ... | b(n − 1) | b(n) | i(1) | (i(2) | i(3) | i(4 | i(5) |

(request message) (req-1)

with the Header segment which is mandatory:

| N° | Field | Length (Byte) | Description |
|---|---|---|---|
| 1 | h(1) | 1 | Command code - it describes the command request to be sent over to the gateway, eg. APDU exchange. |
| 2 | h(2) | 1 | Header segment total length - it describes the total size of the header segment excluding the information code. |
| 3 | h(3) | 1 | Session ID length - the value of session id is an optional field as it is assigned by gateway. Hence, the length can be 0 for the first time request to the gateway. |

-continued

| N° | Field | Length (Byte) | Description |
|---|---|---|---|
| 4 | h(4) | variable | Session ID value - a session id value assigned by the gateway. |
| 5 | h(5) | 1 | Batch sequence - this describes the current sequence of the APDU batch of commands. The sequence range is from 1 to 255. |
| 6 | h(6) | 1 | Fragmented packet sequence - this identifies the sequence of the date packet if it is fragmentized. If there is no fragmentation, the value is set to 0. The sequence range is from 1 to 255. |
| 7 | h(7) | 1 | Information segment index - it indicates the index of the information if the segment exists for a particular message. If the segment doesn't exist, the value is set to 0. The index range is from 1 to 255. | the Body segment which is optional:

| N° | Field | Length (Byte) | Description |
|---|---|---|---|
| 1 | b(1) | 1 | APDU data length - it describes first set of APDU command length within a batch. |
| 2 | b(2) | variable | APDU data value - the first set of APDU command data within a batch. |
| 3 | b(n − 1) | 1 | N set of APDU length. |
| 4 | b(n) | variable | N set of APDU data. | and the Information segment which is optional:

| N° | Field | Length (Byte) | Description |
|---|---|---|---|
| 1 | i(1) | 1 | Information code - it describes the information to be sent over to the gateway, eg. Service Initialization info. |
| 2 | i(2) | 1 | Application ID length. |
| 3 | i(3) | variable | Application ID value - this is a unique application id assign to every application. |
| 4 | i(4) | 1 | Optional information data length. |
| 5 | i(5) | variable | Optional information data value. |

Similarly, the binary response message sent from the server/channel gateway to the device, shall have the format as shown in the following tables:

| Header Segment | | | | | | | Body Segment | | | | | Information Segment | | |
|---|---|---|---|---|---|---|---|---|---|---|---|---|---|---|
| h(1) | h(2) | h(3) | h(4) | h(5) | h(6) | h(7) | b(1) | b(2) | ... | b(n − 1) | b(n) | i(1) | i(2) | i(3) |

(Response message) (res-1)

with the Header segment which is mandatory:

| N° | Field | Length (Byte) | Description |
|---|---|---|---|
| 1 | h(1) | 1 | Response code - it identifies the response status of the gateway. The code 0 usually represents success else if represents failed status. |
| 2 | h(2) | 1 | Session ID length. |
| 3 | h(3) | variable | Session ID value - This field is a session id value assigned by the gateway. |
| 4 | h(4) | 1 | Error code - this describes the error code of the transaction. This field is valid if the response code is not 0. |
| 5 | h(5) | 1 | Batch sequence - this describes the current sequence of the APDU batch of commands. The sequence range is from 1 to 255. |
| 6 | h(6) | 1 | Fragmented packet sequence - this identifies the sequence of the data packet if it is fragmentized. If there is no fragmentation, the value is set to 0. The sequence range is from 1 to 255. |
| 7 | h(7) | 1 | Information segment index - it indicates the index of the information if the segment exist for a particular message. If the segment doesn't exist, the value is set to 0. The index range is from 1 to 255. | the Body segment which is optional:

| N° | Field | Length (Byte) | Description |
|---|---|---|---|
| 1 | b(1) | 1 | APDU data length - it describes first set of APDU command length within a batch. |

-continued

| N° | Field | Length (Byte) | Description |
|----|-------|---------------|-------------|
| 2 | b(2) | variable | APDU data value - the first set of APDU command data within a batch. |
| 3 | b(n − 1) | 1 | N set of APDU length. |
| 4 | b(n) | variable | N set of APDU data. | and the Information segment which is optional:

| N° | Field | Length (Byte) | Description |
|----|-------|---------------|-------------|
| 1 | i(1) | 1 | Information code - it describes the information to be responded from the gateway, eg. Fragmented data size for both sender and receiver. |
| 2 | i(2) | 1 | Optional information data length. |
| 3 | i(3) | variable | Optional information data value. |

The data is broken into fragments as and when required to adapt to the mobile operator environment. The only segment which the message can be broken into fragments is the Body segment. The rest shall retain as a whole complete message entity. Whenever the data is broken into fragments, the application will provide a message to request for more fragments or if the fragmentation is from the application, it will send the consequent sequence of fragment to the gateway.

The following tables defines the request and response binary messages format for fragment handling:

| Header Segment | | Body Segment |
|----------------|---|--------------|
| h(1) | h(2) | b(1) |

(Request for more fragment) (req-2)

with the header segment which is mandatory:

| N° | Field | Length (Byte) | Description |
|----|-------|---------------|-------------|
| 1 | h(1) | 1 | Command code - there are different commands to describe two cases. 1. The request party requests for more fragments from the gateway. 2. The request party sends more fragments to the gateway. |
| 2 | h(2) | 1 | Fragmented packet sequence - it depends on request party or response party fragmentation If it is a request party fragmentation, the sequence identified the current sending fragmented sequence else the request party requests the expected fragmented sequence from the gateway. | and the Body segment which is optional:

| N° | Field | Length (Byte) | Description |
|----|-------|---------------|-------------|
| 1 | b(1) | variable | The fragmented APDU data. It is varied according to the defined fragmented packet size assigned by the gateway. The body segment exists if and only if the fragmentation is from the request side. |

Similarly, the response fragment, shall have the format as shown in the following tables:

| Header Segment | | Body Segment |
|----------------|---|--------------|
| h(1) | h(2) | b(1) |

(Response fragment) (res-2)

with the Header segment which is mandatory:

| N° | Field | Length (Byte) | Description |
|----|-------|---------------|-------------|
| 1 | h(1) | 1 | Response code - it should describe for both cases mentioned in Table 7. The code 0 usually represents success else it represents failed status. 1. The request party request for more fragments from the gateway. 2. The request party sends more fragments to the gateway. |
| 2 | h(2) | 1 | Fragmented packed sequence - it depends on request party or response party fragmentation. If it is a response party fragmentation, the sequence identifies the current sending fragmented sequence to the application else it is the expected next fragmented sequence to be received from the gateway. | and the Body segment which is optional:

| N° | Field | Length (Byte) | Description |
|----|-------|---------------|-------------|
| 1 | b(1) | variable | The fragmented APDU data. It is varied according to the defined fragmented packet size assigned by the gateway. The body segment exists if and only if the fragmentation is from the response side. |

Figure 2:
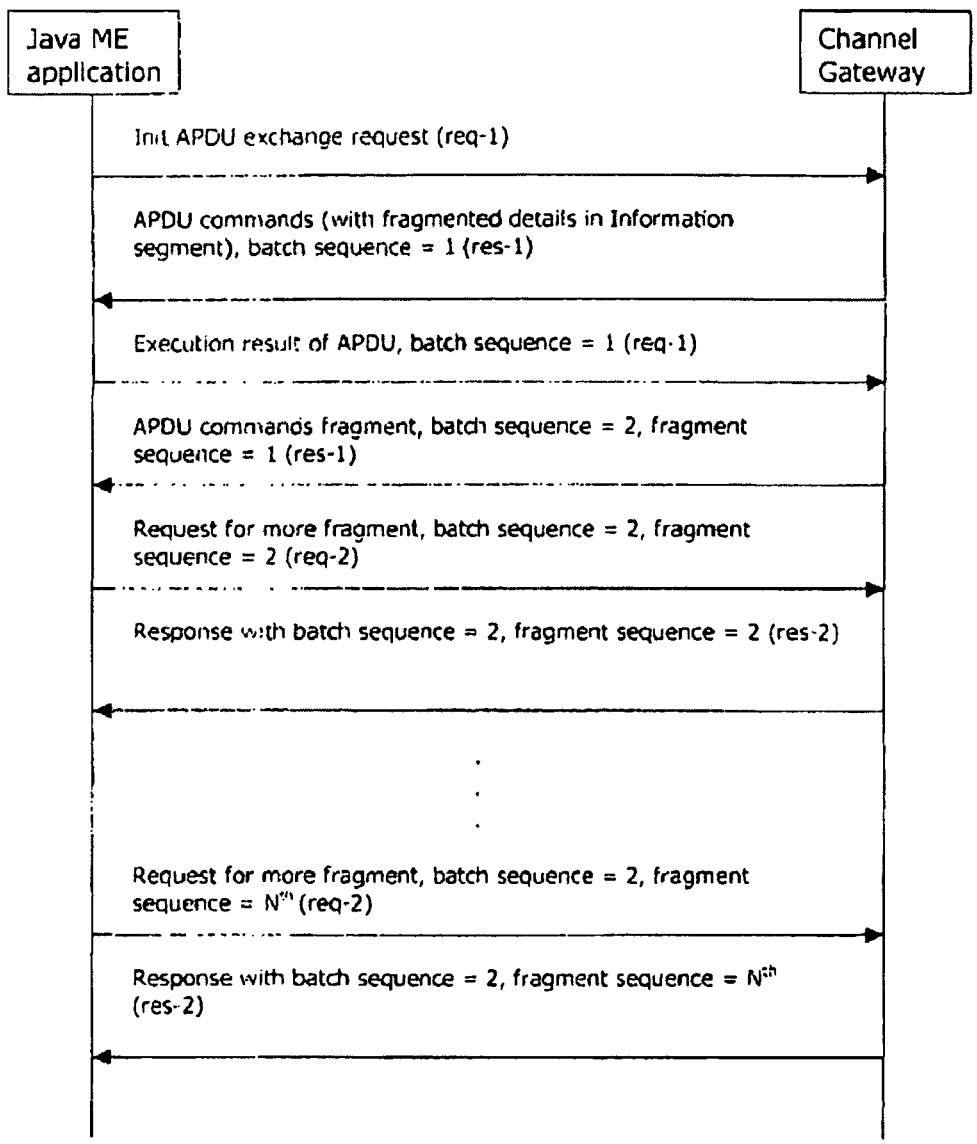
FIG. 2, which illustrates the process of communications between the Java ME® application and the gateway in case of the fragmentation of APDU commands response back from the gateway.

The Java ME® application on the device side shall first initiate a request to current registered operator to gather operator identity details. The information shall send back to the gateway whenever there is a need to request of APDU exchange service. The processing flow of communications between the Java ME® application and the gateway is illustrated in FIG. 1 and in FIG. 2 for cases where, respectively, fragmentation of a batch of execution result of APDU from Java ME application to the gateway occurred and where fragmentation of APDU commands response back from the gateway occurred. In those Figures, the type of request and of response is referenced with req-1, req-2, res-1 and res-2 respectively as in the previous tables. It has to be noted that the first request shall not be fragmented as it carries no predefined fragmented data size for transfer. The subsequent request can be fragmented depending on the need of it, whereas every response is eligible to be fragmented.

The protocol also provides auto recovery functionality in which the Java ME® application is the initiator of the recovery process. The recovery process shall be kicked off if the application does not receive a response within a defined period of time.

Figure 3:
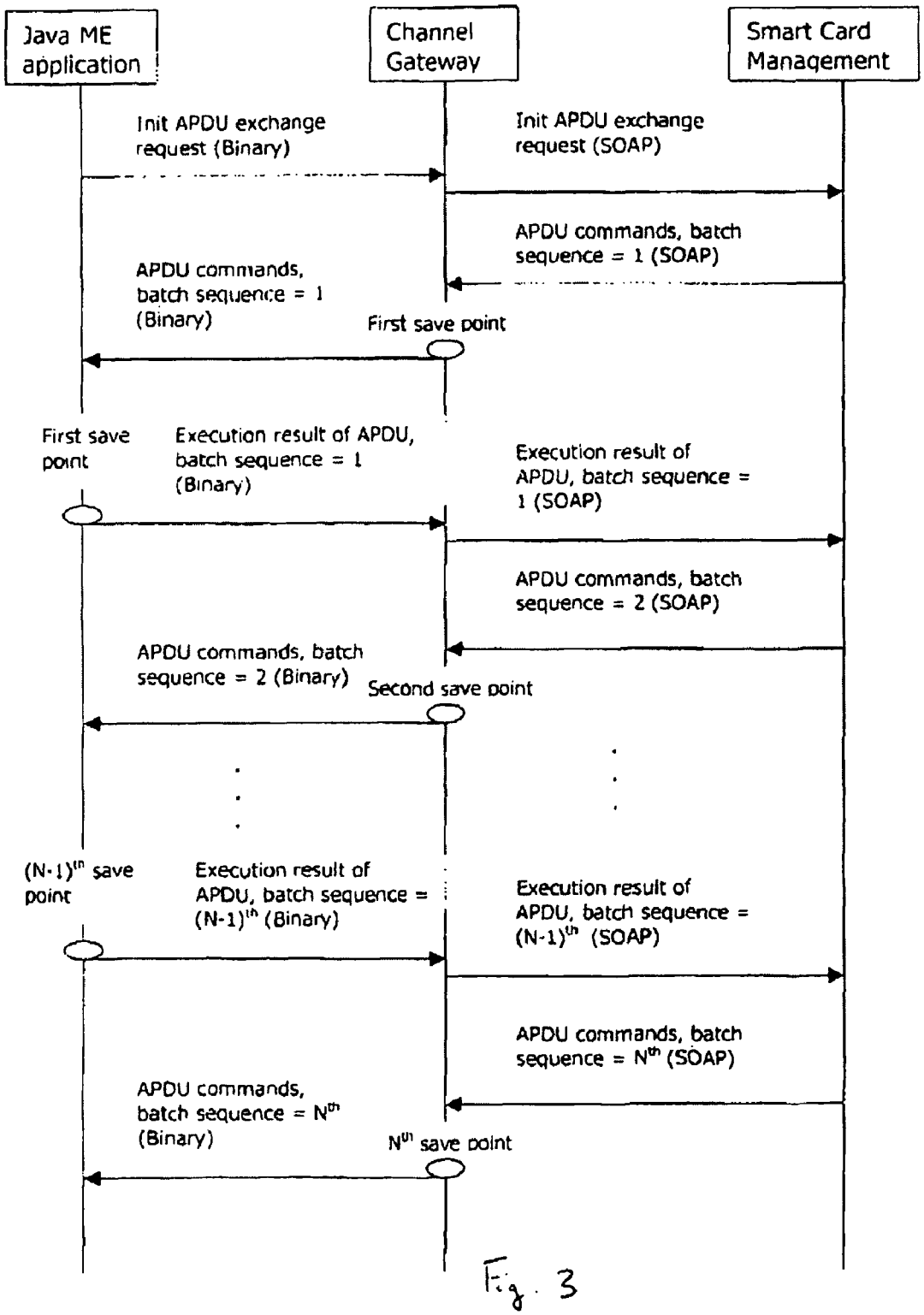
FIG. 3, which illustrates the use of save points in the process to handle auto-recovery capability.

In relation to FIG. 3, the following steps describe how the save points are used in the recovery process and when and where the auto-retry is triggered from the Java ME® application.

1. First, the Java ME application sends an APDU exchange request to the channel gateway.
2. The gateway builds an initial request SOAP message and fires to smart card management system.
3. The first batch of APDU commands is sent to the gateway and the gateway translates the SOAP message into binary message as defined in the next subsection.
4. Before the binary message is sent back to the application, the gateway will create the first save point and the message is saved (in memory, file or Data Base).
5. If this message is received by the application, it will parse the message and exchange the APDU with the secured element. Then, the application prepares a batch of the execution result of APDU commands and sends back to the gateway. Prior to sending back to the gateway, the first save point at the application is created.
6. The application will wait for the next response for a certain period of time (eg. 2 sec). The total timeout period shall be within the whole transaction session boundary. If the client has not received the next response within the timeout period, an auto-retry is triggered. The message from the first save point will be re-sent again. The maximum number of retries is defined according to the bandwidth and reliability of the connection
7. At the gateway side, upon receipt of the batch of execution result of APDU commands, the gateway parses the message and builds SOAP message encapsulated with the execution result and sends it back to the smart card management system.
8. Then the gateway will repeat step 4.
9. While the save point 2 at the gateway is created, another request binary message from the application is received, the gateway will attempt to resend the same message from the saved at save point 2 to the application again.
10. If the application receives the response message, it will repeat step 5, else it will repeat step 6.

The process of APDU exchange will cease if the transaction is complete and the application received the transaction completed with successful status, else the transaction is aborted with error code specified.

What is claimed is:

1. A process of communication between a secure element and a host server, comprising:
   a. generating a batch of APDU commands (SOAP) by said host server;
   b. sending said batch of APDU commands from said host server to said secure element;
   c. transforming said batch of APDU commands (SOAP) to a binary message by a download gateway for optimization of a network;
   d. fragmenting said batch of APDU commands to support limitations of said network and the secure element;
   e. managing a retry mechanism and save failure point during the binary message exchange to support an auto recovery function;
   f. managing the communication to said download gateway by a Java ME (J2ME) application on the secure element;
   g. assembling fragmented binary message by said J2ME application on the secure element comprising one or more binary request messages, said binary request message comprising:
      a header segment part of at least seven bytes;
      a body segment part of N bytes, where N is a variable number; and
      an information segment part of five bytes;
   h. forwarding said APDU commands to said secure element one by one by said J2ME application on the secure element;
   i. collecting all APDU responses by said J2ME application on the secure element; and
   j. building a response binary message by batch by said J2ME application on the secure element comprising one or more binary response messages, said binary response message including:
      a header segment part of at least seven bytes;
      a body segment part of N bytes, where N is a variable number; and
      an information segment part of three bytes.

2. A process according to claim 1, in which the header segment comprises:
   a response code of one byte;
   a session ID value of variable length;
   an error code of one byte;
   a batch sequence of one byte;
   a fragmented packet sequence of one byte; and
   an information segment index of one byte.

3. A process according to claim 1, in which the body segment of both said binary request message and said binary response message comprises:
   an APDU data length of one byte;
   an APDU data value of variable length;
   N set of APDU length of one byte; and
   N set of APDU data of variable length,
   where N is a variable number.

4. A process according to claim 1, in which the information segment comprises:
   an information code of one byte;
   an application ID length of one byte;
   an application ID value of variable length.

5. A process according to claim 4, in which the information segment comprises:
   an information data length of one byte; and
   an information data value of variable length.

6. A process according to claim 1, in which the header segment comprises:
   a response code of one byte;
   a session ID length of one byte;
   a session ID value of variable length;
   an error code of one byte;
   a batch sequence of one byte;
   a fragmented packet sequence of one byte; and
   an information segment index.

7. A process according to claim 1, in which the information segment comprises:
   an information code of one byte.

8. A process according to claim 1, in which more segments are requested by the secure element, wherein:
   the binary request message for one or more fragments, comprising:
      a first header segment part of two bytes and
      a first body segment part of one byte,
   the response of the request for more fragment from the server being a binary response message for more fragment, including:
      a second header segment part of two bytes and
      a second body segment part of one byte.

9. A process according to claim 8, in which the one or more of said first and second header segments comprise:
   a command code of one byte and
   a fragmented packet sequence of one byte.

10. A process according to claim 8, in which the body segments comprise:
fragmented APDU data of variable length.

11. A process according to claim 1 wherein said secure element is a smart card device.

12. A system for communication between a secure element and a host server, wherein the system comprises:
a secure element of any type, including any form factor of smart card such as SIM or embedded secure element or detachable secure element;
a host server adapted to generate APDU commands to be sent to said secure element;
a download gateway adapted to transform APDU commands to binary message for the optimization of a network;
said download gateway adapted to fragment a group of APDU commands by batch to support the limitations of said network and the secure element;
said download gateway adapted to support an auto recovery function by managing a retry mechanism and save failure point during the binary message exchange;
a Java ME (J2ME) application on the secure element adapted to manage the communication to said download gateway;
said Java ME (J2ME) application on the secure element adapted to assemble the fragmented binary message comprising one or more binary request messages, said binary request message comprising:
a header segment part of at least seven bytes;
a body segment part of N bytes, where N a variable number; and
an information segment part of five bytes;
said Java ME (J2ME) application on the secure element adapted to forward APDU commands to a secure element one by one;
said Java ME (J2ME) application on the secure element adapted to collect APDU responses and build a response binary by batch comprising one or more binary response messages, said binary response message including:
a header segment part of at least seven bytes;
a body segment part of N bytes, where N a variable number; and
an information segment part of three bytes.

13. A system according to claim 12, wherein the header segment comprises:
a response code of one byte;
a session ID value of variable length;
an error code of one byte;
a batch sequence of one byte;
a fragmented packet sequence of one byte; and
an information segment index of one byte.

14. A system according to claim 12, wherein the body segment of both said binary request message and said binary response message comprises:
an APDU data length of one byte;
an APDU data value of variable length;
N set of APDU length of one byte; and
N set of APDU data of variable length,
where N is a variable number.

15. A system according to claim 12, wherein the information segment comprises:
an information code of one byte;
an application ID length of one byte; and
an application ID value of variable length.

16. A system according to claim 15, wherein the information segment comprises:
an information data length of one byte; and
an information data value of variable length.

17. A system according to claim 12, wherein the header segment comprises:
a response code of one byte;
a session ID length of one byte;
a session ID value of variable length;
an error code of one byte;
a batch sequence of one byte;
a fragmented packet sequence of one byte; and
an information segment index of one byte.

18. A system according to claim 12, wherein the information segment comprises:
an information code of one byte.

19. A system according to claim 12, wherein more segments are requested by said secure element wherein:
the binary request message for one or more fragment comprising:
a first header segment part of two bytes and
a first body segment part of one byte;
the response of the request for one or more fragment from the server being a binary response message for one or more fragment including:
a second header segment part of two bytes and
a second body segment part of one byte.

20. A system according to claim 19, wherein one or more of said first and second header segments comprise:
a command code of one byte and
a fragmented packet sequence of one byte.

21. A system according to claim 19, wherein one or more of said first and second body segments comprise fragmented APDU data of variable length.

* * * * *